United States Patent [19]

Luebbe, Jr. et al.

[11] 4,308,329
[45] Dec. 29, 1981

[54] MANIFOLD IMAGING METHOD AND MATERIALS

[75] Inventors: Ray H. Luebbe, Jr., Maitland, Fla.; Martin Maltz, Brighton, N.Y.

[73] Assignee: Xerox Corporation, Stamford, Conn.

[21] Appl. No.: 90,770

[22] Filed: Nov. 2, 1979

[51] Int. Cl.³ .............................................. G03G 5/06
[52] U.S. Cl. ...................... 430/40; 430/82; 430/83; 430/901; 430/135; 430/132
[58] Field of Search .................. 430/37, 40, 41, 81, 430/82, 83, 901, 132, 135

[56] References Cited

U.S. PATENT DOCUMENTS

| | | | |
|---|---|---|---|
| 3,421,891 | 1/1969 | Inami et al. | 430/81 X |
| 3,912,508 | 10/1975 | Ikeda et al. | 430/82 X |
| 4,042,388 | 8/1977 | Inoue et al. | 430/81 X |
| 4,172,721 | 10/1979 | Byrne | 430/47 |

Primary Examiner—Roland E. Martin, Jr.

[57] ABSTRACT

An imaging method, and novel materials, in which there is provided an imaging mono-layer comprising a plurality of electrically photosensitive particles which comprise a resin carrier, a colorant dye, an electrically photosensitive organic material, a sensitizing dye, and a solubilizing agent for the sensitizing dye in the organic material. The imaging mono-layer is subjected to an electric field, exposed to a pattern of sensitizing electromagnetic radiation, separation of the photosensitized particles from the unsensitized particles, and color-amplification of the desired image by imbibing the colorant dye into a suitable substrate.

31 Claims, 5 Drawing Figures

MANIFOLD IMAGING METHOD AND MATERIALS

This invention relates to a novel method and materials for producing monochromatic and polychromatic images using electrically photosensitive particles.

BACKGROUND OF THE INVENTION AND PRIOR ART STATEMENT

As indicated in U.S. Pat. No. 3,854,943, in a typical monochromatic manifold imaging system, an imageable member is prepared by coating a layer of a cohesively weak photoresponsive imaging material onto a substrate. This coated substrate is called the "donor". In preparation for the imaging operation, the imaging layer is activated, as by treating it with a swelling agent or partial solvent for the material. This step may be eliminated if the layer retains sufficient residual solvent after having been coated on the substrate from a solution or paste. The activating step provides the dual function of making the top surface of the imaging layer slightly tacky and, at the same time, weakening the imaging layer structurally so that it can be fractured more easily along a sharp line which defines the image to be reproduced. Once the imaging layer is activated, a receiving sheet is laid down over its surface. An electrical potential is then applied across this manifold set while it is exposed to a pattern of light-and-shadow representative of the image to be reproduced. Upon separation of the donor substrate and the receiving sheet, the imaging layer fractures along the lines defined by the pattern of light-and-shadow to which it has been exposed, with part of this layer being transferred to the receiving sheet while the remainder is retained on the donor sheet. Thus, a positive image is produced on one while a negative image is produced on the other. The system is capable of producing monochromatic images of excellent density and resolution. If an attempt is made to uniformly mix pigment particles responding to different colors throughout the imaging material, in some embodiments color reproductions may not be entirely satisfactory since particles of different colors scattered throughout the thickness of the imaging layer may tend to mask each other and prevent stripping of single colors only in desired single colored areas.

To achieve color separation in a single set imaging system, said U.S. Pat. No. 3,854,943 provides a subtractive imaging mono-layer, sandwiched between donor and receiver members, which is comprised of a plurality of randomly mixed agglomerates of at least two different colors which respond selectively to light. The randomly mixed agglomerates in an electric field respond to radiation within their sensitivities by selectively adhering to the receiver during sandwich separation whereupon each individual agglomerate is easily and independently removed from the imaging layer. While images resulting from this system demonstrate excellent color separation, it is largely confined to the use of pigment agglomerates. The nature of the colors in such a system depends entirely on the brilliancy of the individual pigments. Such systems generally result in low color saturation because of the particulate nature of the color entities.

In U.S. Pat. No. 4,172,721, there is provided an imaging method utilizing an imaging monolayer of composite particles. Those particles comprise a small resin particle containing an electrically photosensitive pigment and a solid form or particulate dye material. The monolayer is then subjected to an electric field, exposed to an image pattern of sensitizing electromagnetic radiation, and the image is formed upon separation of the photosensitized composite particles from the unsensitized composite particles, and the dyes of an image are imbibed into a substrate material to color-amplify the image. While that method provides a dense, brilliant, polychromatic, well-fixed dye image in a substrate, the photosensitivity of the "driver" materials in the composite particles is not as spectrally selective as it is sometimes desired.

Accordingly, there is a need for an improved method and materials for imaging using a monolayer of electrically photosensitive particles.

It is, therefore, an object of the invention to provide an imaging method and materials overcoming the above-indicated deficiencies.

It is another object of the present invention to provide a polychromatic imaging system utilizing an imaging mono-layer which is capable of reproducing accurately and vividly a polychromatic original.

SUMMARY OF THE INVENTION

The above objects are accomplished in accordance with the present invention by an imaging method and materials in which there is provided an imaging monolayer having a plurality of electrically photosensitive particles made of a resin carrier, a colorant dye, an electrically photosensitive organic material, a sensitizing dye and a solublizing agent for the sensitizing dye in the organic material. This imaging mono-layer is then subjected to an electric field, exposed to a pattern of sensitizing electromagnetic radiation, the photosensitized particles are separated from the unsensitized particles to form a positive image and a negative image, and the desired image is color-amplified by imbibing the colorant dye into a substrate.

DETAILED DESCRIPTION OF THE INVENTION

Figure 1:
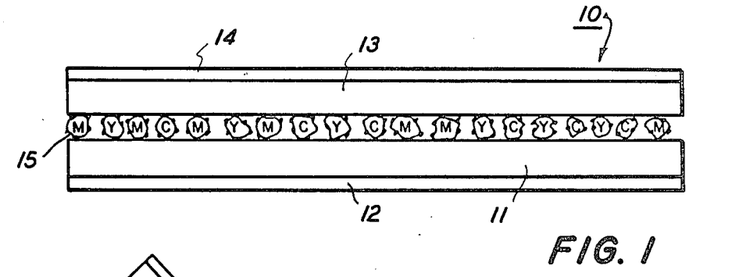
FIG. 1 shows schematically a side elevational view of an imaging member of the present invention.

FIG. 1 shows an imaging member of the present invention with a mono-layer of electrically photsensitive particles. In FIG. 1, an imaging member 10 is composed of a donor member 11 which has a conductive backing 12, a receiving member 13 with its conductive backing 14, and a mono-layer 15 of the electrically photosensitive particles of the invention. The structure of the electrically photosensitive particles will be further described in connection with FIG. 2 below. These particles are coated onto the donor member 11 at a thickness equal to about the diameter of the particles by any suitable coating method well known to those skilled in the art. Typical coating methods include extrusion, air-knife, reverse rod and draw down. As coated, the imaging mono-layer comprises a randomly mixed mono-layer as shown in FIG. 1.

Referring again to FIG. 1, donor member 11 has a conductive backing 12. This conductive backing is preferred where the donor member 11 is insulating and may be eliminated where the donor member 11 is relatively conductive, such as aluminum. Similarly, where the receiving member 13 is insulating, it will preferably have a conductive backing layer 14 as shown in FIG. 1. Again, this conductive backing 14 may be eliminated where receiving member 13 is conductive.

Figure 2:
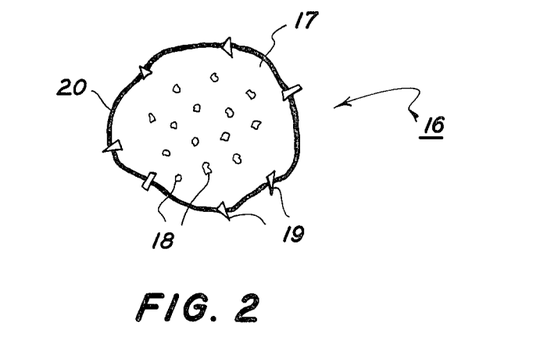
FIG. 2 shows a cross-sectional view of an electrically photosensitive particle of the present invention.

The structure of an individual electrically photosensitive particle which makes up the mono-layer 15 is shown in FIG. 2. The electrically photosensitive particle 16 is made of a resin carrier material 17, and minute pieces of a colorant dye 18 dispersed in the resin carrier. On the surface of the resin carrier material 17, there is a layer of a second resin carrier material 20 into which small pieces of an electrically photosensitive organic material 19 are embedded. The electrically photosensitive organic material 19 is spectrally sensitized with a sensitizing dye, and it also contains a solubilizing agent for the sensitizing dye. The electrically photosensitive organic material 19 is sometimes referred to as the "driver material" inasmuch as it is this material in which the photogeneration takes place during charging and imaging of the particle 16.

It will be appreciated by those skilled in the art that the colorant dye 18 serves to provide the final image a brilliant and sharp dye image, and that resin carrier 17 serves to prevent photosensitization by the colorant dye of the particle 16 during the exposure step. The electrically photosensitive organic material 19, which is sometimes referred to as the driver material, is responsible for the photosensitivity of particle 16, while the second resin carrier 20 facilitates the photosensitization of organic material 19 and hold organic material 19 substantially on the exterior of resin carrier 17. These functions of the components of the photosensitive particle 16 will be further described below.

Figure 3:
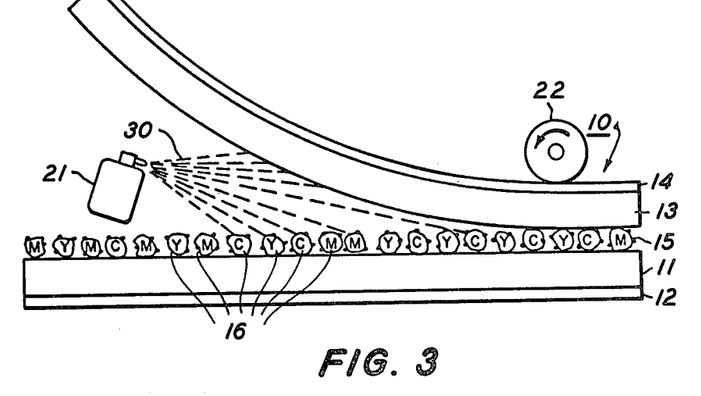
FIG. 3 shows one step in the imaging method of the present invention.

FIG. 3 demonstrates one means of activating the imaging mono-layer 15. As indicated there, the electrically photosensitive particles 16 in mono-layer 15 are covered with an insulating liquid 30, which ultimately enables color separation between the electrically photosensitive particles 16. After application of the insulating liquid 30 by means of an applicator 21, receiver member 13 is set down on the wet mono-layer of particles with the aid of pressure roller 22 to minimize the formation of air gaps in the imaging mono-layer. Suitable insulating liquids which may be used include all insulating liquids which are not solvents for any of the components of the substrate members or the electrically photosensitive particles. By insulating, it is meant any liquid having a resistivity above about $10^{10}$ ohm-cm or of such resistivity as to prevent collapse of the electric field in the imaging layer during the imaging step. Such liquids include aliphatic hydrocarbons, silicone fluids, and fluorinated hydrocarbons. Illustrative of those insulating liquids is Sohio 3440 odorless solvent, a kerosene grade aliphatic hydrocarbon obtained from the Standard Oil Company of Ohio. It will be appreciated that the activating step demonstrated in FIG. 3 may be unnecessary when the imaging member 10 is freshly made. However, it may be preferable to prefabricate imaging member 10 so that it can be handled and stored until it is ready to be used. Under such conditions, it may be desirable to stabilize the imaging mono-layer 16 so as to render the entire imaging member 10 sufficiently rigid to withstand handling, transportation, and storage operations. This can be accomplished by "cementing" the electrically photsensitive particles 16 within the imaging mono-layer 15 together with a soluble inter-particle cement. Such a cement is peferably of the insulating type. Suitable cements for this purpose, depending on the nature of the resin carriers 17 and 20 used, are disclosed in U.S. Pat. Nos. 3,854,943 and 4,172,721. When such a cement is used, the insulating liquid 30 employed in the activating step should be a solvent for the cement so that after the imaging steps, the electrically photosensitive particles 16 may be independently removed from the imaging layer, according to the pattern of electromagnetic radiation to which it is exposed, to form a positive image on either the donor or receiving member.

Figure 4:
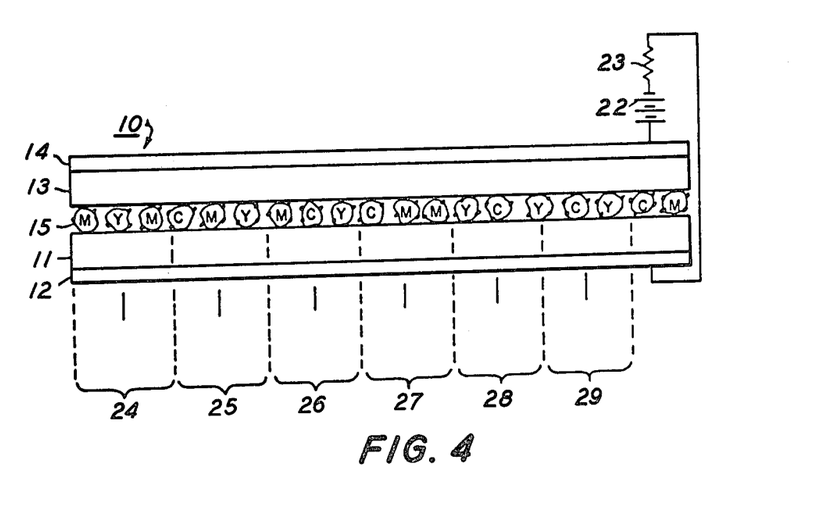
FIG. 4 shows exposure of the imaging member to lights of different colors.

After the imaging member 10 has been activated, the imaging member is then subjected to an electric field and exposed to a pattern of electromagnetic radiation. These steps are illustrated in FIG. 4. In that drawing, the imaging member 10 is shown to be subjected to an electrical potential by means of a potential source 22 and a resistive element 23. The polarity of the potential imposed on the donor member 11 may be either positive or negative, with a preferred polarity orientation for some materials. Preferred applied potentials are in the range of about 500 to about 5000 volts per mil across the imaging member which includes the donor and receiver members. Illustratively, where a 2-mil Mylar sheet for both donor member 11 and receiver member 13 are used, the preferred applied voltage is about 2,000 to about 20,000 volts. It is desirable that a resistor 23 having a resistance on the order of 1 to 20 megohms be included in the circuit. This resistor prevents arcing between the imaging mono-layer 15 and receiver member 13 as they are brought together or separated.

It will be appreciated that in accordance with the teaching of the prior art, particularly U.S. Pat. Nos. 3,595,770, 3,647,659, and 3,447,934, a wide variety of materials and modes for associating an electrical bias therewith are disclosed, and the exposure and electrical field applying steps may be sequential. In addition, as indicated in U.S. Pat. No. 3,616,395, the free surface of the imaging layer may be exposed with an electric field thereacross without the imaging layer being sandwiched between two members at that time.

It is to be understood that the imaging mono-layer configuration shown in the drawings is intended to represent a random mixture of differently spectrally sensitized particles which are electrically photosensitive so that uniform color may be ultimately achieved. As can be seen from the drawings, the tops and bottoms of the individual particles are not necessarily coplanar one to another nor are the particles necessarily touching or spaced a preselected distance apart. The imaging layer is, therefore, a mono-layer of particles and will be referred to throughout as such; but it is understood, of course, that such terminology means any configuration of particles less than two complete and superimposed layers of particles. This random mono-layer insures excellent color separation in the imaging process. In these drawings, the electrically photosensitive particles 16 are marked with the letters "M", "Y", and "C", corresponding to the spectral sensitization of the driver material 19 (see FIG. 2) to magenta, yellow and cyan colors, respectively. These differently spectrally sensitized particles are prepared in separate batches (unimixes) by techniques to be described below, and then all three unimixes are mixed and uniformly dispersed in a vehicle for coating onto the donor member 11.

Referring again to FIG. 4, when such a mono-layer within an imaging member is subjected to an applied electric field and exposed to a colored original, as by projection through one of the donor or receiving members, the effect may be described by dividing the imaging member 10 into several areas in each of which a different light is projected. In FIG. 4, area 24 represents the projection of white light; area 25, the projection of no light; area 26, the projection of red light; area 27, the projection of blue light; area 28, the projection of green light; and area 29, the projection of yellow light.

Figure 5:
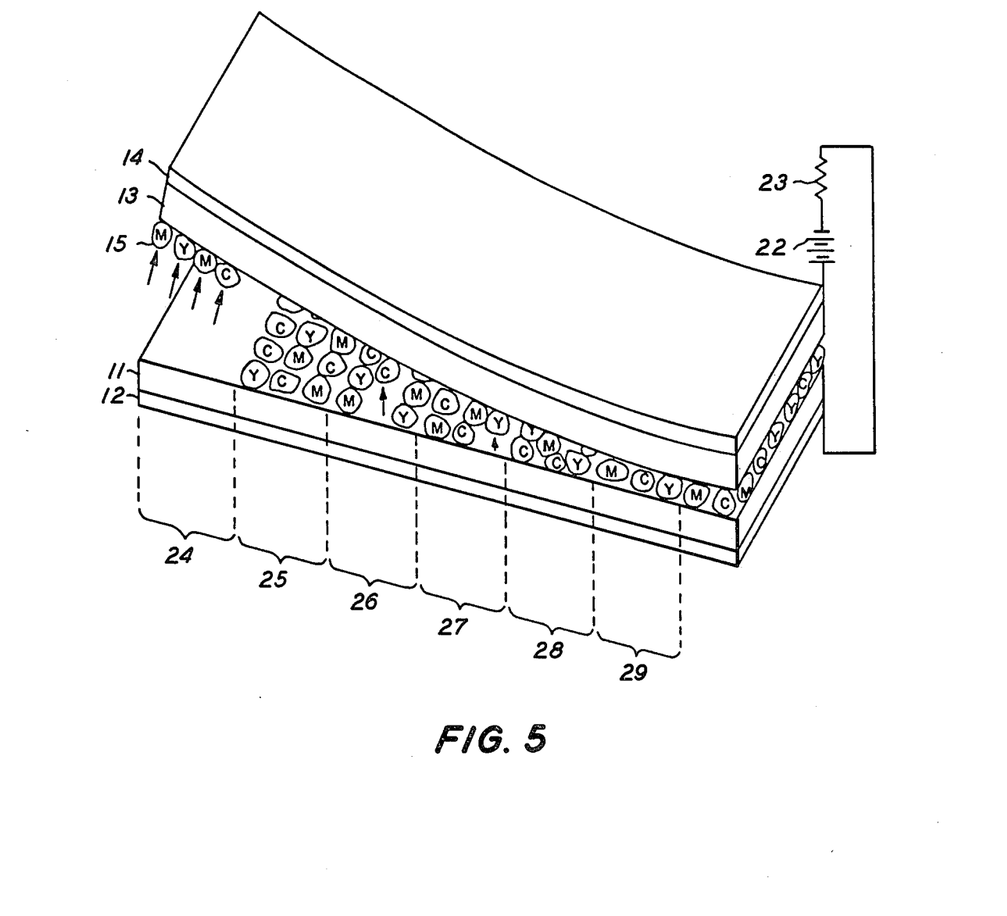
FIG. 5 shows separation of the imaging member to produce the positive image and the negative image.

After exposure, the imaging member 10 is separated as shown in FIG. 5, producing a visible multicolor image. With subtractive color formation, as shown in FIG. 5, the positive color image conforming to the original is ordinarily formed on the donor member 11 while the negative color image is formed on the receiving member 13. The applied potential is maintained across the imaging member during the separating step.

As shown in FIG. 5, white light projection in area 24 results in the transfer of the magenta, yellow, and cyan sensitized particles to the receiving member 13, leaving a white or transparent area on the donor member 11. Where no light strikes the imaging mono-layer, as in area 25, all of the individual particles remain on the donor substrate 11, combining to form a black-appearing area on the donor. Where red light is projected as in area 26, any cyan sensitized particles exposed will transfer to the receiving member 13 upon strip-out leaving behind the magenta and yellow sensitized particles which will later combine to appear red to the eye. Where blue light strikes the imaging material, as in area 27, the yellow sensitized particles will transfer, leaving behind the magenta and cyan which will later combine to appear blue to the eye. Where green light strikes the imaging material, as in area 28, the magenta sensitized material will transfer to leave behind yellow and cyan which will combine to appear green to the eye. Finally, where yellow light strikes the imaging material, as in area 29, the magenta and cyan sensitized materials will transfer, leaving behind only yellow. Integrating this phenomena over the entire surface of the donor member 11 results in a full-colored reproduction of the color original.

The final steps of the imaging process are the imbibition of the colorant dyes 18 within an imaging substrate or other suitable transfer substrate and, optionally, the subsequent removal of the electrically photosensitive organic material and/or the resin carrier materials. As indicated in U.S. Pat. No. 4,172,721, the dye imbibition step results in an aesthetically desireable color image. The process of imbibing a dye material into a substrate converts the dye into a molecularly more dispersed form providing a color saturated image. Generally, the imbibition of the dye into the substrate changes the image from a pale color to a brilliant, saturated, more pleasing color. In order to achieve dye imbibition, the dyes are preferably chosen to disperse in the particular image substrate material. As indicated in said U.S. Pat. No. 4,172,721, the imbibition of the dyes may be accomplished by any suitable means. In the case of a substrate such as Mylar polyester, the dye amplification can be accomplished by heating the positive image on the substrate at about 175° C. from 2 to 5 minutes. In the case of other substrate materials, a solvent imbibition may be preferred. The image from either the receiver or the donor members may be transferred to a further substrate surface in which the dye imbibition may take place. For example, imbibition may occur in a suitable resin layer, as for example in a suitably coated paper by heating or by solvent imbibition.

When conductive backings 12 and 14 are used, they may be rigid or flexible and may comprise any suitable conductive material. Typical conductive materials include: metals such as aluminum, brass, steel, copper, nickel, zinc, etc.; metallic coatings on plastic substrates; rubber made conductive by the inclusion of a suitable material therein; or paper made conductive by the inclusion of a suitable material therein or through conditioning in a humid atmosphere to insure the presence therein of sufficient water content to render the material conductive.

At least one of the donor member 11 or receiving member 13 should be at least partially transparent so that an image may be projected onto the imaging layer therethrough. Preferably, complete transparency is had as for example, by use of Mylar polyester film manufactured by the Dupont Company of Wilimington, Del. Insulating materials suitable for use in members 11 and 13 are polyethylene terephthalate (Mylar polyester film), cellulose acetate, and the like, optionally backed by conductive electrode material such as evaporated tin oxide or vacuum deposited aluminum.

As indicated above, the major improvement in the present invention over that of the U.S. Pat. No. 4,172,721 includes the structure and nature of the electrically photosensitive particles 16. The composite particles of said patent are made with a solid-form dye material, a photosensitive material, in combination with a resin. The color photosensitive material in the composite particles of that patent is generally a pigment. Pigments, by their particulate nature, tend to have a broad action spectral response: in other words, they do not merely absorb light in a narrow frequency range but that they tend to absorb light in a relatively broad range of frequencies. To produce a sharp and precise image of a colored original, it is desirable to have the driver material to be responsive to light in a relatively narrow wavelength range. It has also been found that when a suitable dye is incorporated in a photosensitive material to act as the driver material, it sometimes happens that the sensitivity of the driver material does not increase with increasing amounts of the sensitizing dye but that the maximum sensitivity occurs at a relatively low level of dye concentration. Furthermore, the colorant material in said patent is a non-photosensitive dye. This tends to limit the choice of dyes since the colorant dye must satisfy other requirements such as having the proper color and be well suited for the imbibition step.

In accordance with the present invention, an electrically photosensitive particle is provided which has a driver material which is highly sensitive and yet is spectrally specifically responsive. In addition, the colorant dye which may be used in the photosensitive particles of the present invention may be somewhat photosensitive, if the colorant dyes meet other requirements, since the construction of the photosensitive particles of the present invention will tend to neutralize such photosensitivity on the part of the colorant dye.

Referring to FIG. 2 herein, it is seen that in the electrically photosensitive particle 16 of the present invention, the driver or the photosensitive organic material 19 is imbedded at or near the surface of the particle 16 in the second resin carrier 20. The second resin carrier 20 is selected so that it does not trap the charges generated in the photosensitive organic material 19 to neutralize its photosensitivity. This permits the driver material to be efficiently exposed and sensitized by the sensitizing radiation during the exposure step. The colorant dye material 18, on the other hand, which may be non-photosensitive or which may be somewhat photosensitive, is mostly embedded within the resin carrier material 17. In this configuration, even if the colorant dye selected happens to be somewhat photosensitive, a resin carrier material can be selected which would trap any charges that may be generated by the colorant dye during the exposure step. It is an important aspect of the present invention that any photosensitivity in the colorant dye is substantially neutralized by the proper selection of the resin carrier material 17 and by the method of preparing the electrically photosensitive particle 16 in a manner so that most of the colorant dye material 18 is embedded within the resin carrier material 17.

Another major aspect of the present invention resides in the makeup of the electrically photosensitive organic material 19. Although dye sensitized photosensitive organic materials have been suggested in U.S. Pat. No. 4,172,721, it has been found that the maximum sensitivity for some such dye sensitized photosensitive organic material is quite low and occurs at relatively low concentrations of the sensitizing dye. As a result, the sensitivity of such dye sensitized organic material tends to be very low. Although we do not wish to be bound by the correctness of any scientific explanation, it is believed that the reason for such low sensitivity in some of the photosensitive organic materials is due to the formation of molecular aggregates of the sensitizing dye at higher dye levels. Surprisingly, we have discovered that by the use of a solubilizing agent which is compatible both with the sensitizing dye and the photosensitive organic material, a higher concentration of the sensitizing dye may be effectively used, resulting in a higher sensitivity of the sensitized organic material.

Suitable photosensitive organic materials which may be used in the driver material 19 of the present invention are generally disclosed in the said U.S. Pat. No. 4,172,721. The preferred photosensitive organic materials which may be used in the present invention include poly-N-vinyl carbazole, poly-acenaphthylene, and small molecule organic photoconductors such as triphenylamine in a polycarbonate matrix. A particularly preferred photosensitive organic material for use in the present invention is poly-N-vinyl carbazole.

Suitable sensitizing dyes for use in the photosensitive particles of the present invention should have a sharp spectral absorption peak at the desired light wavelength, and be generally compatible with the photosensitive organic materials selected. Examples of sensitizing dyes which may be used with the preferred photosensitive organic material of poly-N-vinyl carbazole include: yellow sensitizing—Basic Yellow 1, which is believed to have the structural formula:

which is available from the Dupont Company under its trade name Thioflavine TCN; cyan sensitizing—Eastman Dye No. 7663, available from the Eastman Kodak Company, and believed to be 3-ethyl-2-[5-(3-ethyl-2-benzothiazolinylidene)-1, 3-pentadienyl] benzothiazolium iodide or an oxazine dye; and magenta sensitizing—Rhodamine B, which is believed to have the structural formula:

of Rhodamine 6G with the structural formula:

Both Rhodamine dyes were obtained from Matheson Coleman Bell.

As indicated above, the solubilizing agent should be generally compatible with both the photosensitive organic material and the sensitizing dye to be used. We have found polyethylene glycol, polycaprolactone, and polycaprolactone diol to be suitable solubilizing agents, depending on the particular photosensitive organic material and the sensitizing dye selected. When poly-N-vinyl carbazole is used as the photosensitive organic material, its monomer, N-vinyl carbazole, also may be used as a solubilizing agent. However, polyethylene glycol is particularly preferred as the solubilizing agent.

Suitable resin materials which may be used as the resin carrier 17 in the electrically photosensitive particle 16 of the present invention include those resin materials disclosed in U.S. Pat. No. 4,172,721. The selection of a particular resin carrier material depends on the nature of colorant dye to be used. Thus, if a somewhat photosensitive colorant dye is to be used and that dye will generate positive charges or holes during the exposure step, then the resin carrier material 17 selected should trap such positive charges and not permit such charges to migrate towards the surface of the particle and there to adversely affect the photosensitivity of the particle as a whole. Examples of resin carrier materials which are capable of trapping positive charges include a copolymer of 2-vinyl pyridine/styrene and poly-2-vinyl pyrrolidone. When the colorant dye selected generates negative charges during the exposure step, the resin carrier materials 17 to be used should be capable of trapping the negative charges. Examples of such resin carrier materials include various vinyl acetate polymers and copolymers and polystyrene. It is also known that various resin carrier materials are relatively neutral in their ability to trap charges. Such resin materials include polyethylenes and polypropylenes, etc. It will be appreciated that all of these resin carrier materials are insulating materials, Generally, we have found that it is sometimes desirable to use a resin carrier material which is a copolymer of two or more monomeric materials to result in the proper level of charge trapping capability.

The selection of a suitable resin for use as the second resin carrier 20 should be with reference to its function in the photosensitive particle 16. The second resin carrier 20 should hold the photosensitive organic material 19 at the surface of the photosensitive particle 16, and the resin should not trap the charges generated by the organic material. Since, in the nature of the colorant dye-sensitizing dye pair, the dyes frequently photogenerate charges of the same polarity, the resin carriers 17 and 20 would have opposite charge trapping capabilities. For our preferred photosensitive organic material of poly-N-vinylcarbazole, and the associated sensitizing and colorant dyes, we have found that polystyrene is very suitable as the second resin carrier.

The colorant dyes which can be used in the electrically photosensitive particles of the present invention are those dyes which have the proper colors and possess the required properties for the imbibition step. Examples of specific and preferred colorant dyes which may be used in the photosensitive particles of the present invention include: Disperse Red 11; Eastman Polyester Yellow 6GLSW; and Disperse Blue 60. Generally, the dyes disclosed in U.S. Pat. No. 4,172,721 may be used herein.

The methods for making the electrically photosensitive particles and their component parts include the mill and heat method, solvent-nonsolvent precipitation method, and freeze-drying method. The mill and heat method and the solvent-nonsolvent precipitation have been generally described in U.S. Pat. No. 4,172,721, and they will be further illustrated by the examples herein. The freeze-drying method is a versatile method for preparing particles in a micron to submicron size range. Generally, under the freeze-drying method, the components of the particle such as the electrically photosensitive organic material 19 and the resin carrier 17 having the colorant dye incorporated therein, are separately prepared and suspended together in a liquid vehicle which should have a suitable freezing point and a relatively high vapor pressure in the solid state. The liquid vehicle is a solvent for the second carrier material 20, which is added to the suspension. The suspension is then placed in a freeze-drier, for example, a Labconco Freeze-Dry 12. Under the low temperature and reduced pressure in the freeze-drier, the vehicle-solvent will evaporate to leave behind a freeze-dried solid.

Generally, the electrically photosensitive particles of the present invention average between about 0.5 to 25 microns in diameter. A preferred size of the particles is from about 1 to 15 microns.

The invention will now be described with reference to the following specific examples.

EXAMPLE I

The sensitivity of dye sensitized poly N-vinyl carbazole (PVK) was determined at several levels of dye concentrations. For each level of dye concentration, a batch of dye sensitized PVK was prepared by ball milling 5 grams of PVK for 16 hours with the proper amount of dye added as a solid in 50 ml of 10 percent isopropanol in Sohio Solvent 3440. The container was a 125 ml plastic bottle filled approximately half full with 350 grams of ¼" stainless steel shot. The dye used was Rhodamine 6G, and sufficient amounts of the dye were used to result in a molar dye concentrations of 0.1 percent, 0.5 percent, 1.0 percent and 2.5 percent. After milling, the dyed polymer was filtered through a 200 mesh nylon screen to remove coarse particles, then vacuum filtered, using a sintered glass funnel to collect particles which were then stored in the dark as a wet paste until used.

The several differently dyed batches of PVK were then coated onto a one mil thick aluminum foil with a number 10 Mayer rod, which is a solid stainless steel rod having a 10 mil diameter stainless steel wire wound tightly around the rod. The dye sensitized PVK was suspended in the Sohio Solvent, with about 1 gram of solid per 10 grams of the solvent, and coated in an amount of about 0.2 milligram per square centimeter. A 2 mil thick Mylar sheet was then placed on top of the coating and exposure made through the Mylar sheet. A voltage of about 5,000 volts was applied across the sandwich, with the Mylar sheet placed on a NESA glass and the NESA conductive film serving as one of the electrodes. The sandwich was then exposed through the NESA glass and the Mylar substrate. The exposure was from a white light source projected through a calibrated neutral step wedge having 0.211 optical density per step. The sensitivity (toe) of the dyed PVK was determined by calculating the exposure for the first step to display visible background.

The results for the four batches of dyed PVK so obtained were: for the PVK with 0.1 mole percent of Rhodamine 6G, an exposure of 184 ergs per square centimeter corresponding to a sensitivity of 54.3 centimeter square per millijoule (mj); for the PVK with 0.5 mole percent dye, an exposure of 567 ergs per square centimeter, corresponding to a sensitivity of 17.6 cm square per mj; for the PVK with 1 mole percent of dye, an exposure of 878 ergs per square cm, corresponding to a sensitivity of 11.4 cm square per mj; and for the PVK containing 2.5 mole percent dye, an exposure of 1727 ergs per square cm, corresponding to a sensitivity of 5.8 cm square per mj. It can be seen from these results that the dyed PVK has a decreasing sensitivity with increasing dye concentration. Although we do not wish to be bound by any scientific explanation, it is believed that this unexpected result is due to the aggregation of the dye in the PVK, and that those aggregates in the form of dimers and trimers, etc., neutralize some of the charges generated during the exposure step, thus reducing the sensitivity of the dyed PVK.

EXAMPLE II

Several batches of the PVK dyed with Rhodamine 6G having a solubilizing agent for the dye were prepared. The solubilizing agent used was polyethylene glycol, in an amount equal to 5 weight percent of the PVK used. These batches of dyed PVK were prepared by freeze drying a solution of PVK, the dye, and polyethylene glycol.

Two grams of PVK and 0.1 gram of polyethylene glycol were dissolved in 100 ml of benzene in a 300 ml cylindrical flask. The proper amount of Rhodamine 6G was then dissolved in 10 ml of tertiary butyl alcohol at 50° C. The combined solution was brought up to 150 ml with benzene warmed to 50° C. then frozen in the shell freezer of a Labconco Freeze-Dry 12 for one hour. The Labconco Freeze-Dry 12 freeze drier had two single stage compressors, one for the condenser chamber and the other for a built in shell freezer. The condenser chamber maintained a temperature of −50° C. and the shell freezer −45° C. Dry ice could be added to the solvent in the bath to reduce the temperature to −75° C.

The amounts of Rhodamine 6G used in the batches corresponded to 0.1 mole percent of dye in the PVK, 0.5 mole percent, 1.0 mole percent, 2.0 mole percent, and 4.0 mole percent of the dye. The samples were put on the freeze drier for 16 hours under a pressure of about 700 millitorr. The freeze dried solids were removed from the flask by rinsing with Sohio solvent, ball milled 4 hours with $\frac{1}{4}''$ stainless steel shot, filtered through 200 mesh cloth, and finally collected by vacuum filtration in a sintered glass funnel. The samples were then stored as a wet paste until used.

The samples were coated and exposed in a procedure similar to that of Example I, except that the light was filtered so that the exposure was at 540 nm and the midpoint sensitivity was taken rather than the toe sensitivity. The resulting exposure and sensitivity data for five batches of PVK containing 5 weight percent polyethylene glycol and various amount of dye were: for 0.1 mole percent Rhodamine 6G, an exposure of 14.1 ergs per square centimeter, corresponding to a sensitivity of 0.709 centimeter square per micro-joule; for 0.5 mole percent dye, an exposure of 6.8 ergs per square centimeter, and a sensitivity of 1.47 centimeter square per micro-j; at 1.0 mole percent concentration of dye, an exposure of 6.3 ergs per square centimeter, corresponding to a sensitivity of 1.59 centimeter square per micro-j; at 2.0 mole percent dye, an exposure of 24.4 ergs per square centimeter, corresponding to a sensitivity of 0.41 centimeter square per micro-j; and at the 4.0 mole percent dye, an exposure of 69.9 ergs per square centimeter, corresponding to a sensitivity of 0.143 centimeter square per micro-j.

It can be seen that from the above results, the sensitivity of the dyed PVK initially increased with the increasing dye concentration, up to about 1 mole percent of the dye, and then it fell with further increases in dye concentration. This data suggests that dye aggregates do not form in the PVK with 5 weight percent polyethylene glycol until the dye concentration exceeds one mole percent.

EXAMPLE III

This example illustrates the procedure for making the core for the electrically photosensitive particles of the present invention. The colorant dye used was Disperse Red 11, corresponding to magenta, obtained from American Color and Chemical. 4.4 grams of the colorant dye and 6.6 grams of a 2-vinyl pyridine/styrene copolymer obtained from Scientific Polymer Products, which is said to have about 30 percent styrene in the copolymer, were charged into a 250 ml polyethylene bottle and milled for 16 hours in 70 ml of the Sohio solvent with 700 grams of $\frac{1}{4}''$ stainless steel shot. After milling, the mixture was digested for 2 hours at 108° C. The mixture was then quenched with 125 ml of Sohio solvent, cooled to 25° C., filtered through 200 mesh cloth, and finally collected in a sintered glass funnel, using vacuum filtration.

Similar procedure is to be used for making the cores containing colorant dyes corresponding to the other two primary colors. The colorant dyes to be used are: Eastman Polyester Yellow, available from the Eastman Kodak Company; and Disperse Blue 60, corresponding to cyan, and available from the Dupont Company.

EXAMPLE IV

The core containing the Disperse Red 11 colorant dye made in accordance with the procedure of Example III was used in preparing the electrically photosensitive particles of the present invention, using the dye sensitized PVK driver material prepared in accordance with the procedure of Example II. The dye sensitized PVK material used contained 5 weight percent polyethylene glycol and 1 molar percent of the sensitizing dye. The sensitizing dye used was Rhodamine 6G, for magenta. 2.78 grams of the core solid material was slurried in 400 ml of cyclohexane with 1.67 grams of dyed PVK material. The mixture was filtered and reslurried and filtered and slurried once more. The resultant paste-like mixture was suspended in 50 ml of cyclohexane containing 0.56 grams of polystyrene. To this slurry, 300 ml of the Sohio solvent was slowly added over a period of 20 minutes to precipitate the polystyrene. The paste was reslurried twice in 400 ml of the Sohio solvent, filtered and stored until used.

Similar procedure is to be used for preparing the electrically photosensitive particles corresponding to yellow and cyan. The sensitizing dyes to be used with such particles are: Basic Yellow 1, available from the Dupont Company under the name Thioflavine TCN; and Eastman Dye No. 7663, for cyan.

EXAMPLE V

This Example illustrates the freeze-drying method for preparing the electrically photosensitive particles of the present invention. The mixture of core material and the dye sensitized PVK driver material were slurried and filtered as in Example IV. The driver-core mixture paste was then suspended in 125 ml of cyclohexane containing 0.56 grams of polystyrene. This mixture was put in a 300 ml freeze-dry flask, and the volume brought up to 170 ml with additional cyclohexane. The resulting mixture was then freeze-dried for 16 hours.

EXAMPLE VI

The electrically photosensitive particles prepared in accordance with the procedures of Examples IV and V were coated onto a 1 ml aluminum foil, and then imaged using a sheet of polyvinyl acetate (PVA) coated Mylar as the transparent electrode. The PVA layer and the imaging particles upon it were adhesively transferred by lamination to Kromekote paper. The image on the paper was then dye amplified. Excellent images were obtained by this method. A comparison of the action spectrum of the pure driver material and the electrically photosensitive particles showed that the sharp action response of the dyed PVK is retained in the electrically photosensitive particles made in accordance with the present invention. Moreover, the action spectrum of the electrically photosensitive particles is much sharper than the action spectra for the particles made in accordance with U.S. Pat. No. 4,172,721.

It will be appreciated that the dye sensitized PVK has superior action spectrum and thus, may be used by itself as the electrically photosensitive particles. However, due to the low level of dye in such sensitized PVK material, it is too pale to be a good colorant. Accordingly, it is a further aspect of the present invention that the photo response of the driver material and the colorimetric properties of the colorant dye are separately optimized to result in an efficient overall system.

While the invention has been described in detail with reference to specific and preferred embodiments, it will be appreciated that various modifications may be made from the specific details without departing from the spirit and scope of the invention.

What is claimed is:

1. A method of imaging comprising:
   a. providing an imaging mono-layer comprising a plurality of electrically photosensitive particles made of a resin carrier, a colorant dye, and an electrically photosensitive organic material, said organic material being sensitized by a sensitizing dye and a solubilizing agent for said sensitizing dye, said resin carrier comprising two components: a first component substantially surrounding said colorant dye, said first component being selected to prevent photosensitization of said particles by said colorant dye during the exposure step; and a second component substantially surrounding said first component and the colorant dye, said second component being selected to facilitate the photosensitization of said particles by said organic material,
   b. applying an electric field across said imaging mono-layer;
   c. exposing the imaging mono-layer to a pattern of electromagnetic radiation to which said mono-layer is sensitive;
   d. separating the photosensitized particles from the unsensitized particles during the application of said electric field so that a positive image and a negative image are formed corresponding to the original pattern; and
   e. fixing at least one of said images onto a substrate.

2. A method of claim 1 wherein said fixing is by imbibing the colorant dye into said substrate.

3. A method according to claim 1 wherein said mono-layer contains an electrically insulating liquid to facilitate the separation of the photosensitized particles from the unsensitized particles.

4. A method of claim 3 wherein said mono-layer is sandwiched between a donor member and a receiver member, at least one of said members being at least partially transparent to said electromagnetic radiation, so that said photosensitized particles and unsensitized particles are separated by separating said members.

5. A method of claim 4 wherein said photosensitive particles are of substantially uniform size having an average diameter up to about 25 microns.

6. A method of claim 1 wherein said first component of said resin carrier comprises a copolymer of 2-vinyl pyridine/styrene or poly-2-vinyl pyrrolidone.

7. A method of claim 1 wherein said second component of said resin carrier comprises polystyrene.

8. A method of claim 1 wherein said photosensitive organic material comprises poly-N-vinyl carbazole.

9. A method of claim 8 wherein said colorant dye is Disperse Red 11, said sensitizing dye is Rhodamine 6G, and said solubilizing agent is polyethylene glycol.

10. A method of claim 8 wherein said colorant dye is Eastman Polyester Yellow 6GLSW, said sensitizing dye is Basic Yellow 1, and said solubilizing agent is polyethylene glycol.

11. A method of claim 8 wherein said colorant dye is Disperse Blue 50, said sensitizing dye is Eastman Dye 7663, and said solubilizing agent is polyethylene glycol.

12. A method of claim 1 wherein said images are color images, and wherein said mono-layer comprises a mixure of at least two different electrically photosensitive particles, each of said at least two particles having a sensitizing dye and colorant dye pair corresponding to different colors in said pattern of electromagnetic radiation.

13. A method of claim 12 wherein said mono-layer comprises a mixture of three different photosensitive particles, each of which having therein as the sensitizing dye—colorant dye pair Rhodamine 6G—Disperse Red 11, Basic Yellow 1—Eastman Polyester Yellow 6GLSW, Eastman Dye 7663—or Disperse Blue 60.

14. A method of making the electrically photosensitive particles of claim 1 comprising mixing said photosensitive organic material, said sensitizing dye and said solubilizing agent to form a dye sensitized organic material, mixing said colorant dye and said first component of the resin carrier to form a particle core material having the colorant dye substantially surrounded by said first component of said resin carrier, suspending said dye sensitized organic material and said particle core material and said second component of said resin carrier in a liquid vehicle, and removing said liquid vehicle to form said photosensitive particles.

15. A method of claim 14 wherein said liquid vehicle comprises cyclohexane.

16. A method of claim 14 further comprising precipitation of the suspended second component of the resin carrier prior to removing said liquid vehicle.

17. A method of claim 14 wherein said liquid vehicle is removed by freeze-drying the suspended mixture.

18. An imaging member comprising a mono-layer sandwiched between a donor member and a receiver member, at least one of said members being at least partially transparent to electromagnetic radiation to which said mono-layer is sensitive, said mono-layer comprising a plurality of electrically photosensitive particles made of a resin carrier, a colorant dye, and an electrically photosensitive organic material spectrally sensitized with a sensitizing dye and a solubilizing agent for said sensitizing dye, said resin carrier comprising two components: a first component substantially surrounding said colorant dye, said first component being selected to prevent photosensitization of said particles by said colorant dye during the exposure of said imaging member; and a second component substantially surrounding said first component and the colorant dye, said second component being selected to facilitate the photosensitization of said particles by said organic material.

19. An imaging member of claim 18 wherein said photosensitive particles are of substantially uniform size having an average diameter up to about 25 microns.

20. An imaging member of claim 18 wherein said first component of the resin carrier comprises a copolymer of 2-vinyl pyridine/styrene or poly-2-vinyl pyrrolidone.

21. An imaging member of claim 18 wherein said first component of the resin carrier comprises a copolymer of 2-vinyl pyridine/styrene.

22. An imaging member of claim 21 wherein said second component of said resin carrier comprises polystyrene.

23. An imaging member of claim 18 wherein said electrically photosensitive organic material comprises poly-N-vinyl carbazole, poly-acenaphthylene, or triphenylamine in a polycarbonate matrix.

24. An imaging member of claim 18 wherein said electrically photosensitive organic material comprises poly-N-vinyl carbazole.

25. An imaging member of claim 18 wherein said solubilizing agent comprises polyethylene glycol, polycaprolactone, polycaprolactone diol, or N-vinyl carbazole.

26. An imaging member of claim 18 wherein said solubilizing agent comprises polyethylene glycol.

27. An imaging member of claim 18 wherein said mono-layer comprises a mixture of at least two different electrically photosensitive particles, each of said at least two different particles having a sensitizing dye-colorant dye pair corresponding to different colors in said electromagnetic radiation.

28. An imaging member of claim 27 wherein said mono-layer comprises a mixture of three different photosensitive particles each of which having therein as the sensitizing dye-colorant dye pair Rhodamine 6G—Disperse Red 11, Basic Yellow 1—Eastman Polyester Yellow 6GLSW, or Eastman Dye 7663—Disperse Blue 60.

29. An electrically photosensitive material comprising a mixture of photosensitive organic material, a sensitizing dye, and a solubilizing agent for the sensitizing dye, said solubilizing agent is polyethylene glycol, polycaprolactone, polycaprolactone diol, or N-vinyl carbazole.

30. An electrically photosensitive material of claim 29 wherein said photosensitive organic material is poly-N-vinyl carbazole.

31. An electrically photosensitive material of claim 30 wherein said sensitizing dye is Rhodamine 6G, Basic Yellow 1, or Eastman Dye 7663.

* * * * *